United States Patent [19]

Naim

[11] Patent Number: 5,468,100
[45] Date of Patent: Nov. 21, 1995

[54] ADJUSTABLE GAP TWO-MEMBER ROTARY TOOL

[75] Inventor: Moshe Naim, Kfar Tavor, Israel

[73] Assignee: Kant-ly Ltd., Tel Aviv, Israel

[21] Appl. No.: 354,331

[22] Filed: Dec. 12, 1994

[51] Int. Cl.⁶ ..................................................... B23C 5/16
[52] U.S. Cl. ............................ 409/234; 407/31; 409/138
[58] Field of Search .................................... 409/138, 213,
409/217, 232, 234, 236; 408/191, 193,
54, 224, 239 R, 708, 233; 407/31; 451/510,
521; 83/508.3, 665, 425.4; 279/8

[56] References Cited

U.S. PATENT DOCUMENTS

| | | | |
|---|---|---|---|
| 1,470,144 | 10/1923 | Carroll et al. | 408/708 |
| 1,898,732 | 2/1933 | Krohne | 407/31 |
| 2,644,348 | 7/1953 | Castle | 408/224 |
| 4,674,923 | 6/1987 | Ogilvie et al. | 409/217 |
| 5,211,635 | 5/1993 | Omi et al. | 408/191 |

*Primary Examiner*—Daniel W. Howell
*Attorney, Agent, or Firm*—Mark M. Friedman

[57] ABSTRACT

A rotary device for simultaneously treating two or more regions of a workpiece, which includes a rotatable shaft having an externally threaded portion. Mounted on the shaft, connected to the shaft or integrally formed with it, is a first tool. The device further includes a second tool which is mounted on the externally threaded portion of the shaft. The second tool is internally threaded so that rotation of the second tool axially displaces the second tool along the shaft, thereby changing the spacing between the two tools. The device further includes a set screw or similar mechanism for fixing the second tool at a location along said externally threaded portion of said shaft.

8 Claims, 1 Drawing Sheet

ADJUSTABLE GAP TWO-MEMBER ROTARY TOOL

FIELD AND BACKGROUND OF THE INVENTION

The present invention relates to rotary tools and, more particularly, to rotary tool which have two operating surfaces for simultaneous processing of the workpiece.

Various rotary tools are currently in use. In certain applications it is desirable to operate on two portions of the workpiece. Thus, for example, in finishing a slab of wood which is to become a table top it may be desirable to give both the top and top of the edge of the slab a rounded appearance.

One way of accomplishing this is to first operate on the top surface and then on the bottom, or vice versa. A disadvantage of finishing the workpiece sequentially is that it is difficult to maintain a uniform spacing between the two regions being operated on so that the result may be an edge which is less than completely uniform.

To overcome this difficulty, a number of rotary tools have been developed which have two cutting tools, each properly oriented, mounted on the same rotating shaft. The two tools are mounted so that they have a fixed spacing relative to each other. Use of such a tool thus allows the user to simultaneously operate on two regions of the workpiece, leading to a much more uniform product.

A disadvantage of such two-tool rotary devices is that the spacing between the two (or more) tools is fixed so that a single tool can only be used for a given spacing. Thus, for example, a series of tools, each with a different fixed spacing between the tools, must be kept on hand in order to accommodate the variety of jobs to be encountered. Furthermore, even with a series of differently spaced devices, there often arises a need for a spacing which is intermediate between two available devices.

There is thus a widely recognized need for, and it would be highly advantageous to have, a rotary device having two or more tools for simultaneously operating on two or more regions of a workpiece, where one or more of the tools is mounted so that the spacing between adjacent tools can be varied substantially continuously.

SUMMARY OF THE INVENTION

According to the present invention there is provided a rotary device for simultaneously treating two or more regions of a workpiece, comprising: (a) a rotatable shaft, the shaft including an externally threaded portion; (b) a first tool mounted on, connected to, or integrally formed with, the shaft; (c) a second tool, mounted on the externally threaded portion of the shaft, the second tool being internally threaded so that rotation of the second tool axially displaces the second tool along the shaft; and (d) means for fixing the second tool at a location along the externally threaded portion of the shaft.

According to further features in preferred embodiments of the invention described below, the the first tool is mounted on the externally threaded portion of the shaft, the first tool being internally threaded so that rotation of the first tool axially displaces the first tool along the shaft, and the device further comprises second means for fixing the first tool at a location along the externally threaded portion of the shaft.

According to yet further features in preferred embodiments of the invention the first tool is connected to, or integrally formed with, the shaft at a fixed location.

According to further features in preferred embodiments of the invention described below, the means for fixing the second tool includes a set screw.

The present invention successfully addresses the shortcomings of the presently known configurations by providing a rotary device which features two or more tools spaced axially apart by a distance which can be continuously varied by the user.

The present invention is characterized in that at least one of the tools is a separate unit which includes an internally threaded hole. The tool can then be rotated over an externally threaded portion of the shaft so as to move the tool axially in either direction, thereby changing the spacing between the tool and one or more other tools which are mounted on the shaft. When the desired spacing has been achieved, the tool can be fixed in position, as by a set screw, to preserve the spacing during operations.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a rotary device having a plurality of cutting tools for operating simultaneously on a plurality of regions of a workpiece. Specifically, the present invention is of a multi-tool rotary device wherein the spacing between adjacent tools can be continuously adjusted.

The principles and operation of a rotary device according to the present invention may be better understood with reference to the drawings and the accompanying description.

Figure 1:
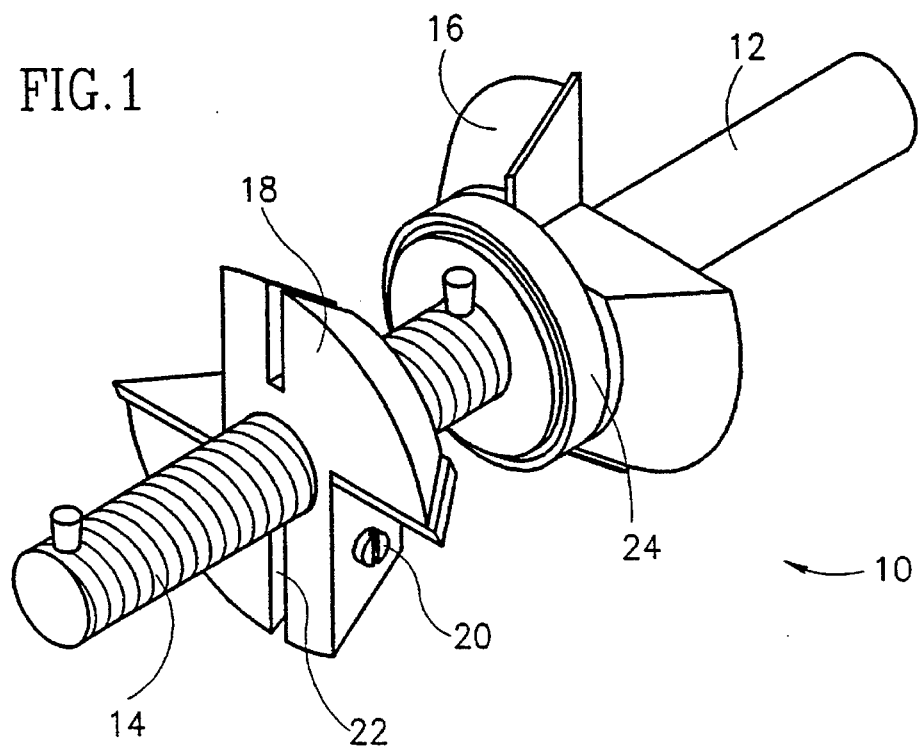
FIG. 1 is a perspective view of a device according to the present invention.
Figure 2:
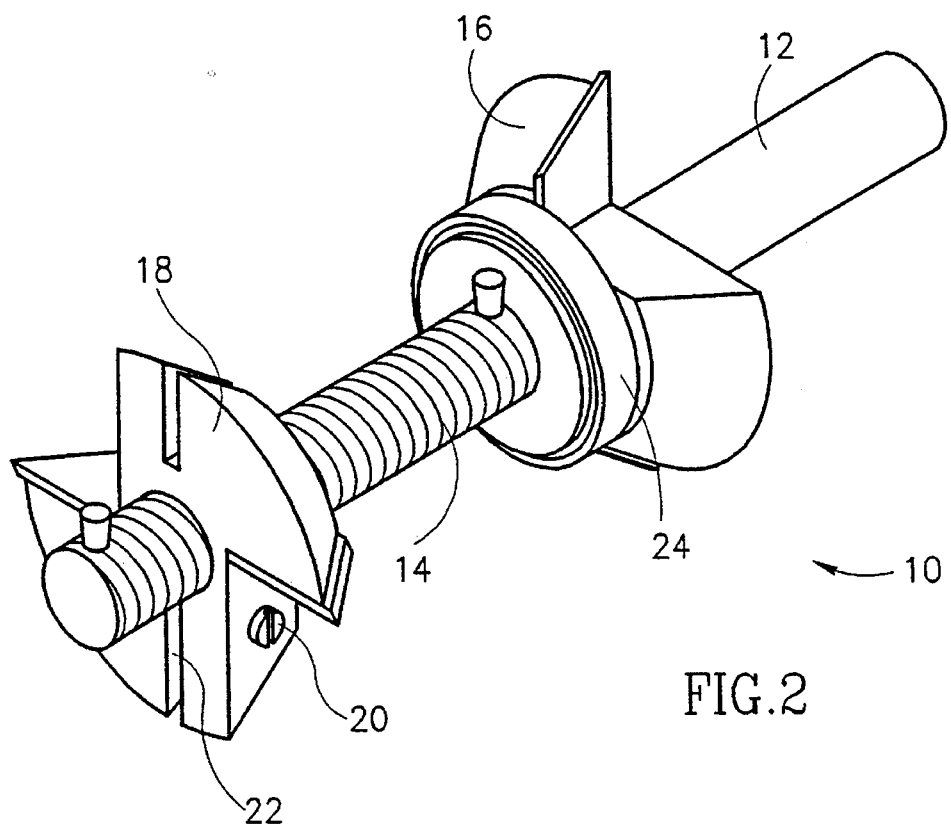
FIG. 2 is a perspective view of the device of FIG. 1 with the two cutting tools shown at a different spacing.

Referring now to the drawings, FIGS. 1 and 2 illustrate a rotary device 10 according to the present invention. The rotary device includes a shaft 12 which, in operation, is connected to a motor which imparts rotation to shaft 12. A portion of rotatable shaft 12 is externally threaded so that shaft 12 includes an externally threaded portion 14.

Permanently connected to, or integrally formed with, rotary device 10 at a fixed location is a first tool 16.

A separate second tool 18 having an internally threaded opening is mounted on externally threaded portion 14 of shaft 10. Thus, rotation of second tool 18 displaces second tool 18 axially along shaft 12 in continuous fashion, thereby changing the spacing between second tool 18 and first tool 16.

In alternative embodiment according to the present invention, first tool 16 also has an internally threaded opening and is also mounted on the externally threaded portion 14 of shaft 10. Thus, rotation of first tool 18 serves to displace first tool 16 axially along shaft 12 in continuous fashion, thereby also changing the spacing between second tool 18 and first tool 16.

A suitable means for fixing the second tool 18, or first tool 16 of the alternative embodiment, at a desired location along shaft 12 is provided. Preferably, such means includes a set screw 20 mounted on second tool 18. Most preferably, second tool 18 includes a slot or gap 22 which is bridged by set screw 20 so that the tightening of set screw 20 causes second tool 18 to squeeze shaft 12 and thereby fix the location of second tool 18 relative to shaft 12.

As will readily be appreciated, it is possible to include additional tools beyond the two tools shown in FIGS. 1 and 2 and described above.

Preferably, a device according to the present invention further includes a spacer 24 for fixing the distance from shaft 12 to the workpiece during operations. Most preferably, spacer 24, which is located between a pair of tools, is freely rotatable.

While the invention has been described with respect to a limited number of embodiments, it will be appreciated that many variations, modifications and other applications of the invention may be made.

What is claimed is:

1. A rotary device for simultaneously treating two or more regions of a workpiece, comprising:
   (a) a rotatable shaft, said shaft including an externally threaded portion;
   (b) a first tool mounted on, connected to, or integrally formed with, said shaft;
   (c) a second tool, mounted on said externally threaded portion of said shaft, said second tool being internally threaded so that rotation of said second tool axially displaces said second tool along said shaft; and
   (d) means for fixing said second tool at a location along said externally threaded portion of said shaft.

2. A device as in claim 1, wherein said first tool is mounted on said externally threaded portion of said shaft, said first tool being internally threaded so that rotation of said first tool axially displaces said first tool along said shaft, and further comprising second means for fixing said first tool at a location along said externally threaded portion of said shaft.

3. A device as in claim 1, wherein said first tool is connected to, or integrally formed with, said shaft at a fixed location.

4. A device as in claim 3, wherein said means for fixing said second tool includes a set screw.

5. A device as in claim 4, wherein said second tool is formed with a slot through which said set screw is positioned.

6. A device as in claim 3, further comprising a spacer for fixing the distance from said shaft to the workpiece.

7. A device as in claim 6, wherein said spacer is freely rotatable.

8. A device as in claim 6, wherein said spacer is mounted on said shaft intermediate between said first tool and said second tool.

* * * * *